(12) United States Patent
Kikuchi et al.

(10) Patent No.: US 11,878,889 B2
(45) Date of Patent: Jan. 23, 2024

(54) END EFFECTOR

(71) Applicant: Panasonic Intellectual Property Management Co., Ltd., Osaka (JP)

(72) Inventors: Takeshi Kikuchi, Osaka (JP); Hideyuki Kouno, Osaka (JP); Yuzuka Isobe, Osaka (JP); Yoshinari Matsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 17/716,503

(22) Filed: Apr. 8, 2022

(65) Prior Publication Data
US 2022/0227599 A1 Jul. 21, 2022

Related U.S. Application Data

(63) Continuation of application No. PCT/JP2020/034845, filed on Sep. 15, 2020.

(30) Foreign Application Priority Data

Oct. 11, 2019 (JP) .................................. 2019-188134

(51) Int. Cl.
*B65H 41/00* (2006.01)
*B25J 15/00* (2006.01)

(52) U.S. Cl.
CPC .......... *B65H 41/00* (2013.01); *B25J 15/0071* (2013.01); *B65H 2301/51122* (2013.01)

(58) Field of Classification Search
CPC .................... B25J 15/0071; B65H 2301/51122
(Continued)

(56) References Cited

U.S. PATENT DOCUMENTS

| 4,898,376 A | * | 2/1990 | Sumi | ..................... B65H 41/00 271/272 |
| 10,449,755 B2 | * | 10/2019 | Watanabe | ........... H01L 21/6838 |
| 2013/0062020 A1 | * | 3/2013 | Ries | .................. H01L 21/67092 156/760 |

FOREIGN PATENT DOCUMENTS

| JP | 5914308 | 5/2016 |
| JP | 2021154404 A | * 10/2021 |

OTHER PUBLICATIONS

International Search Report dated Dec. 1, 2020 in corresponding International Application No. PCT/JP2020/034845.

* cited by examiner

*Primary Examiner* — Leslie A Nicholson, III
(74) *Attorney, Agent, or Firm* — Wenderoth, Lind & Ponack, L.L.P.

(57) ABSTRACT

An end effector connectable to a robot arm for peeling off release paper includes a housing including a guide groove having a start position S, an intermediate position M, and an end position E and a rotary unit including a needle and a first support movable along the guide groove. Assume that a line segment connecting the start position S and the intermediate position M is defined as a line segment SM, a line segment connecting intermediate the position M and the end position E is defined as a line segment ME, an angle formed between the line segment SM and a horizontal direction when the end effector is placed on a floor surface is defined as $\theta_1$, and an angle formed between the line segment SM and the line segment ME is defined as $\theta_2$, $\theta_1 < \theta_2 < \theta_1 + 180°$ is satisfied.

7 Claims, 8 Drawing Sheets

(58) Field of Classification Search
USPC .................................................. 270/52.11
See application file for complete search history.

END EFFECTOR

BACKGROUND

1. Technical Field

The present disclosure relates to an end effector.

2. Description of the Related Art

Patent Literature (PTL) 1 describes a method in which a film attached onto an adhesive sheet of a workpiece held at a predetermined position by the hand of one arm of a dual arm robot as an articulated robot is peeled off from the adhesive sheet by the hand of the other arm of the dual arm robot, and the workpiece is attached to a predetermined region by the hand of the one arm of the dual arm robot.

PTL 1 is Japanese Patent No. 5914308.

SUMMARY

An object of the present disclosure is to provide an end effector that can peel off release paper.

The present disclosure is an end effector that is connectable to a robot arm for peeling off release paper and includes a housing including a guide groove having a start position S, an intermediate position M, and an end position E and a rotary unit including a needle and a first support movable along the guide groove. There is provided an end effector that satisfies $\theta_1 < \theta_2 < \theta_1 + 180°$ when it is assumed that a line segment connecting the start position S and the intermediate position M is defined as a line segment SM, a line segment connecting the intermediate position M and the end position E is defined as a line segment ME, an angle formed between the line segment SM and a horizontal direction when the end effector is placed on a floor surface is defined as $\theta_1$, and an angle formed between the line segment SM and the line segment ME is defined as $\theta_2$. This makes it possible to peel off the release paper using the end effector.

The present disclosure can provide an end effector that can peel off release paper.

DETAILED DESCRIPTION

Background to the Present Disclosure

A robot device used in a factory or the like can perform various operations by attaching an end effector to a robot arm. The work is, for example, picking components flowing on a factory production line or assembling components using a robot hand as an end effector. In general, the robot arm and the end effector are controlled by a control device (controller) connected to the robot arm.

As a type of end effectors, there are a type that includes fingers and grips a workpiece with the fingers, a type that can deform the distal end of a hand like a so-called soft hand, and the like.

When components are assembled in a factory, workpieces may be bonded to each other by an adhesive sheet such as a double-sided tape. This adhesive sheet is protected by release paper before the bonding step is performed. Accordingly, in order to perform the bonding step, the release paper needs to be peeled off from the adhesive sheet.

In the invention disclosed in PTL 1, the distal end portion of the claw portion needs to enter the boundary portion between the edge portion of the double-sided tape and the edge portion of the release paper corresponding thereto. In order for the robot device to automatically perform such an operation, it is necessary to accurately control the robot device.

Accordingly, in the present disclosure, the release paper is peeled off by a simpler method using an end effector including a needle. Such an end effector according to the present disclosure will be described below.

(Appearance Structure of End Effector 1)

Figure 1:
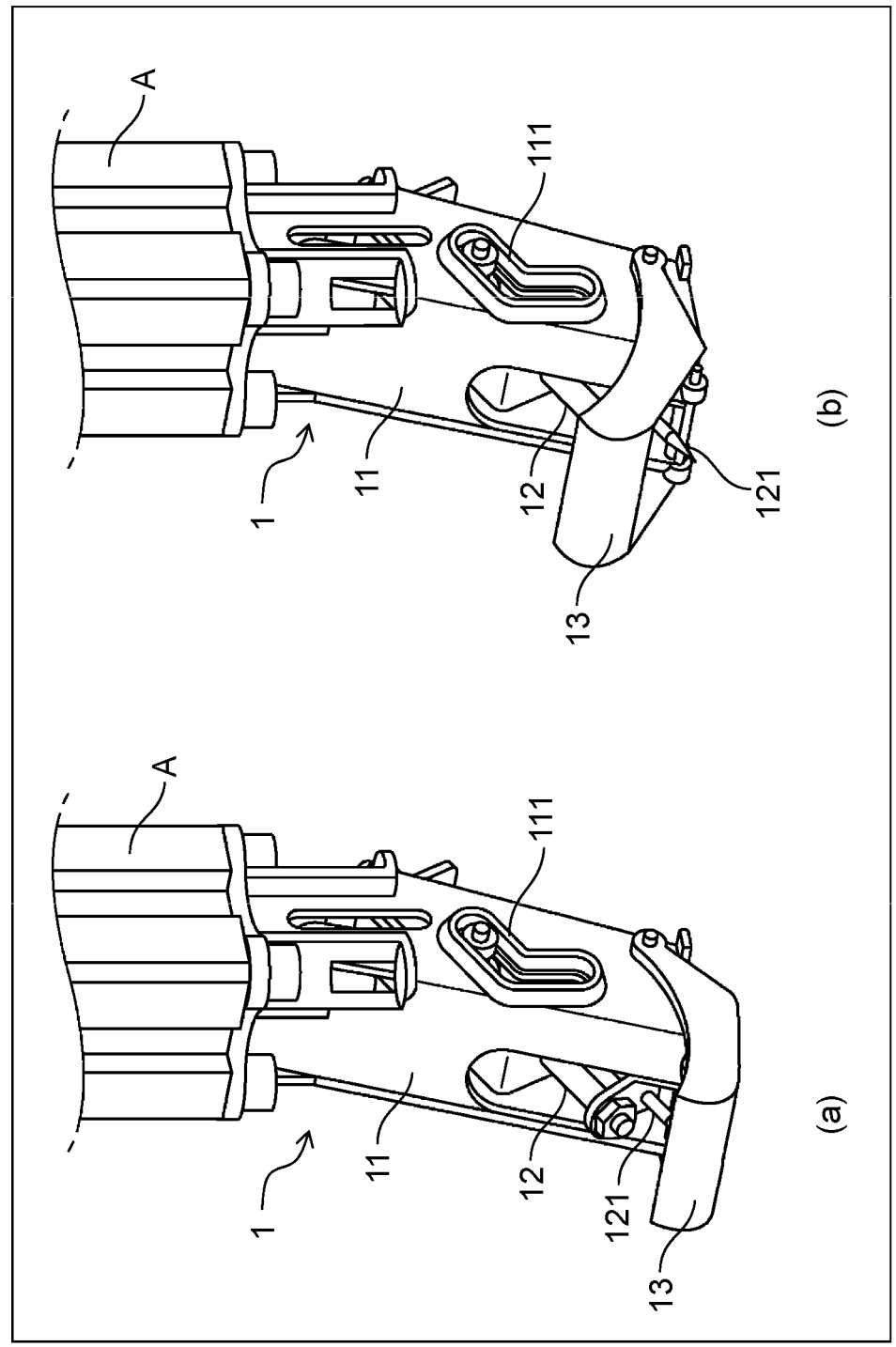
FIG. 1 is a perspective view illustrating an appearance structure of end effector 1 according to one aspect of the present disclosure.

FIG. 1 is a perspective view illustrating an appearance structure of end effector 1 according to one aspect of the present disclosure. Part (a) of FIG. 1 illustrates a state in which cover 13 covers the tip of needle 121, and part (b) of FIG. 1 illustrates a state in which cover 13 is pivoted upward and the tip of the needle 121 is exposed. End effector 1 is connected to an articulated robot arm (not illustrated) to perform various operations on a workpiece. In this example, end effector 1 connectable to the robot arm performs work of peeling off the release paper from the adhesive sheet.

End effector 1 includes housing 11 and rotary unit 12. End effector 1 may additionally include cover 13.

Housing 11 is connected to the distal end of actuator A of the robot arm and substantially defines the outer shape of end effector 1. Housing 11 includes guide groove 111. Guide groove 111 is a groove that guides the movement of rotary unit 12 and has a dogleg shape in the illustrated example. However, the shape of the guide groove 111 is not limited to a dogleg shape. Guide groove 111 will be described in detail later.

Rotary unit 12 is disposed in housing 11. Rotary unit 12 includes needle 121 at its distal end. Rotary unit 12 is driven by actuator A of the robot arm, pierces the release paper with needle 121, rotates needle 121 together with rotary unit 12 to lift up the release paper in a scooping manner and peel off the release paper from the adhesive sheet. The mechanism of rotary unit 12 will also be described in detail later.

Cover 13 is a safety member that is provided at an end portion of housing 11 on the side opposite to actuator A and protects needle 121 of rotary unit 12 so as not to inadvertently pierce various places. In addition, cover 13 may also have a function of removing the release paper pierced by needle 121 from needle 121 as described later. Cover 13 will be described in detail later.

(Internal Structure of End Effector 1)

Figure 2:
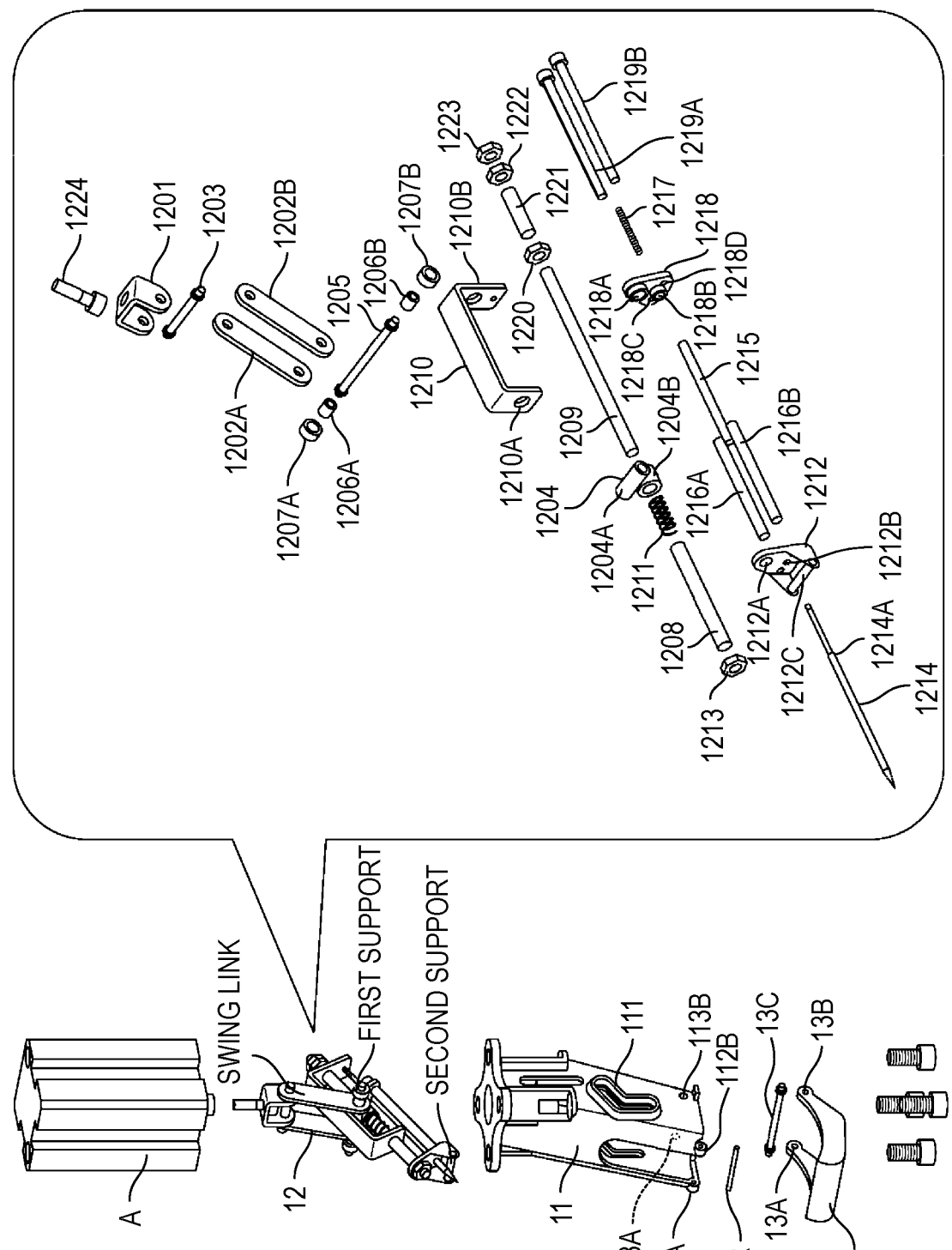
FIG. 2 is an exploded view of end effector 1 illustrated in FIG. 1.
Figure 3:
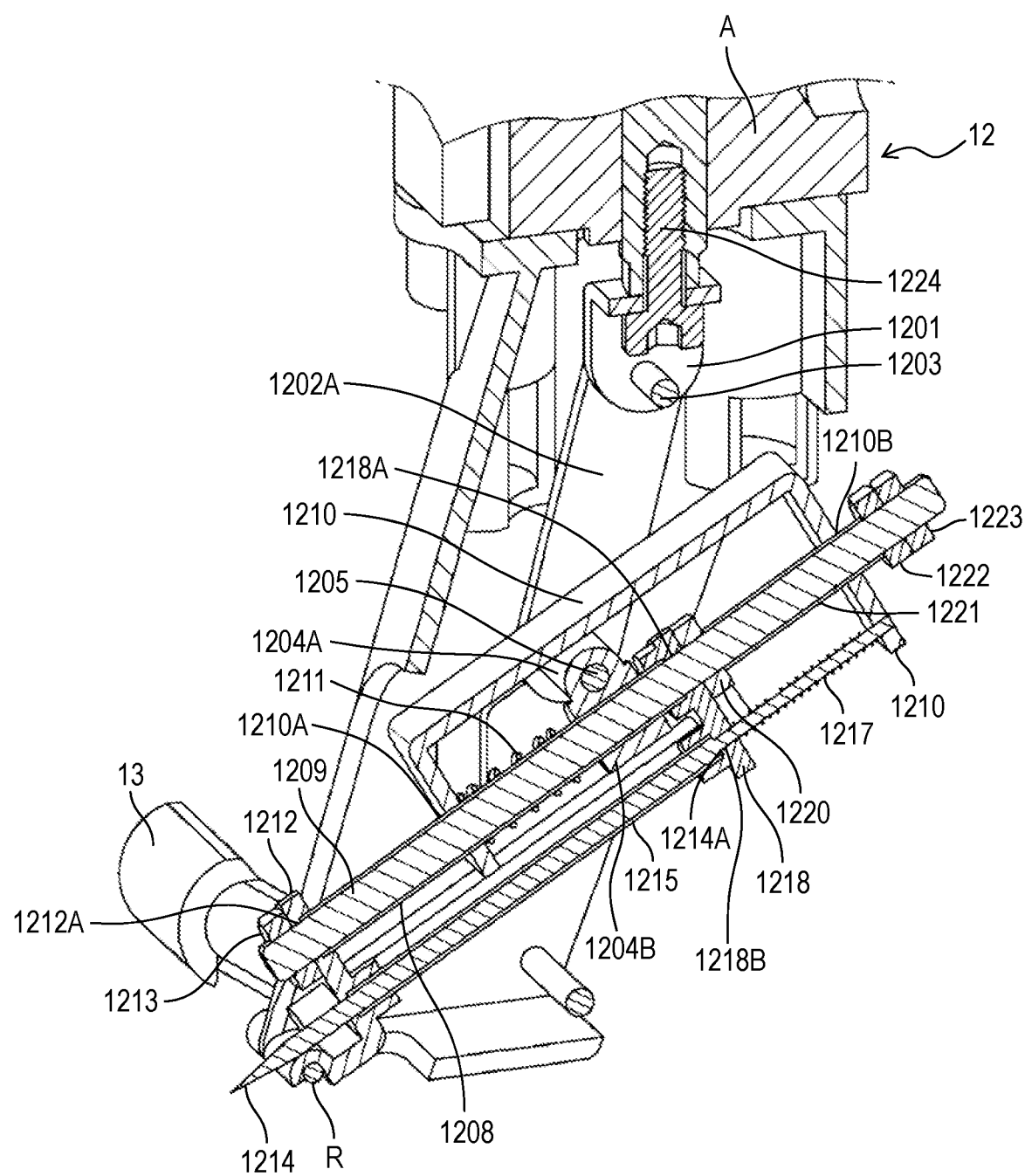
FIG. 3 is a sectional view of rotary unit 12 illustrated in FIG. 2.

FIG. 2 is an exploded view of end effector 1 illustrated in FIG. 1. FIG. 3 is a sectional view of rotary unit 12 illustrated in FIG. 2. The internal structure of end effector 1 will be described below with reference to FIGS. 2 and 3. Since a general actuator may be used as actuator A, a description of the actuator will be omitted.

In this example, rotary unit 12 may have a configuration like that illustrated on the right side of FIG. 2. First link plate 1201 is rotatably connected to one end of each of two second link plates 1202A and 1202B through first rotation shaft 1203. Screw 1224 is inserted into first link plate 1201, and screw 1224 is screwed into the distal end of actuator A (see FIG. 3).

The other end of each of second link plates 1202A and 1202B is rotatably connected to holder 1204 through second rotation shaft 1205. Holder 1204 has the shape formed by joining cylinder 1204A and cylinder 1204B orthogonal to each other. Second rotation shaft 1205 passes through cylinder 1204A. Pipes 1206A and 1206B and ball bearings 1207A and 1207B are respectively provided at both ends of second rotation shaft 1205. Second link plates 1202A and 1202B and ball bearings 1207A and 1207B are connected to second rotation shaft 1205 through pipes 1206A and 1206B. Ball bearings 1207A and 1207B constitute first support of rotary unit 12.

Full screw 1209 is inserted into cylinder 1204B of holder 1204. As illustrated in FIG. 3, one end of full screw 1209 is fastened with nut 1213, and the other end is fastened with nuts 1222 and 1223. That is, full screw 1209 penetrates through each member between nut 1213 and nut 1223. More specifically, full screw 1209 penetrates through nut 1213, first hole 1212A provided in rotation base 1212, pipe 1208, hole 1210A provided in one end of U-shaped pin pressure plate 1210, coil spring 1211 (elastic body), cylinder 1204B, hole 1218A provided in rotation base support 1218, nut 1220, pipe 1221, hole 1210B provided in the other end of pin pressure plate 1210, nut 1222, and nut 1223.

Pipe 1208 is provided so as to cover a part of the outer periphery of full screw 1209. One end of pipe 1208 is inserted and fastened in first hole 1212A provided in rotation base 1212 (see FIG. 3). The other end of pipe 1208 is inserted and fastened in hole 1218A provided in rotation base support 1218 (see FIG. 3). Pipe 1208 penetrates through hole 1210A provided in one end of pin pressure plate 1210, coil spring 1211, and cylinder 1204B. Coil spring 1211 is disposed to wind around the outside of pipe 1208. Coil spring 1211 is disposed between one end of pin pressure plate 1210 closer to hole 1210A and cylinder 1204B, and exerts an elastic force between them.

Pipe 1221 is provided so as to cover a part of the outer periphery of full screw 1209. Pipe 1221 passes through hole 1210B provided in the other end of pin pressure plate 1210, and one end of pipe 1221 is fastened with nut 1220 and the other end is fastened with nut 1222.

Stepped pin 1214 is inserted into second hole 1212B provided in rotation base 1212. Stepped pin 1214 serves as needle 121 of rotary unit 12. The rear end of stepped pin 1214 is reduced in diameter. The portion of stepped pin 1214 which is reduced in diameter is expressed as shoulder portion 1214A.

One end of each of two pipes 1216A and 1216B is inserted into rotation base 1212. The other end of each of two pipes 1216A and 1216B is inserted into a corresponding one of two holes 1218C and 1218D provided in rotation base support 1218. Hexagon socket bolts 1219A and 1219B are respectively inserted into pipes 1216A and 1216B through holes 1218C and 1218D.

Pipe 1215 is provided between rotation base 1212 and rotation base support 1218. Stepped pin 1214 described above is inserted into pipe 1215. Shoulder portion 1214A of stepped pin 1214 abuts on cylindrical receiving portion 1218B provided on rotation base support 1218 (see FIG. 3).

Small-diameter coil spring 1217 is disposed between rotation base support 1218 and an end of hole 1210B of pin pressure plate 1210. A diameter reduced portion of the rear end of stepped pin 1214 is inserted into coil spring 1217.

For example, rotary unit 12 having the above structure is housed in housing 11 (see FIG. 2). Guide grooves 111 are provided in both sides of housing 11. In the illustrated example, ball bearings 1207A and 1207B are attached so as to cooperate with guide grooves 111.

Housing 11 has holes 112A and 112B in its lower portion. There is a space between hole 112A and hole 112B. Small-diameter rod R passes through hole 112A, cylinder 1212C, and hole 112B while cylinder 1212C of rotary unit 12 is disposed in this space. Then, rotary unit 12 and housing 11 are rotatably connected to each other through small-diameter rod R. Cylinder 1212C is the second support of rotary unit 12. As is clear from FIGS. 2 and 3, cylinder 1212C as the second support is provided on a side closer to the tip of needle 121 (stepped pin 1214) than ball bearings 1207A and 1207B as the first support.

Although not essential, cover 13 is attached to housing 11. Holes 113A and 113B are provided in both sides of the lower portion of housing 11. In a state where fulcrum portions 13A and 13B provided on both wings of cover 13 are aligned with holes 113A and 113B, rotation shaft 13C passes through hole 113A, fulcrum portion 13A, fulcrum portion 13B, and hole 113B. With such a configuration, cover 13 is pivotable with respect to housing 11.

(Step of Peeling Off Release Paper Using End Effector 1)

Figure 4:
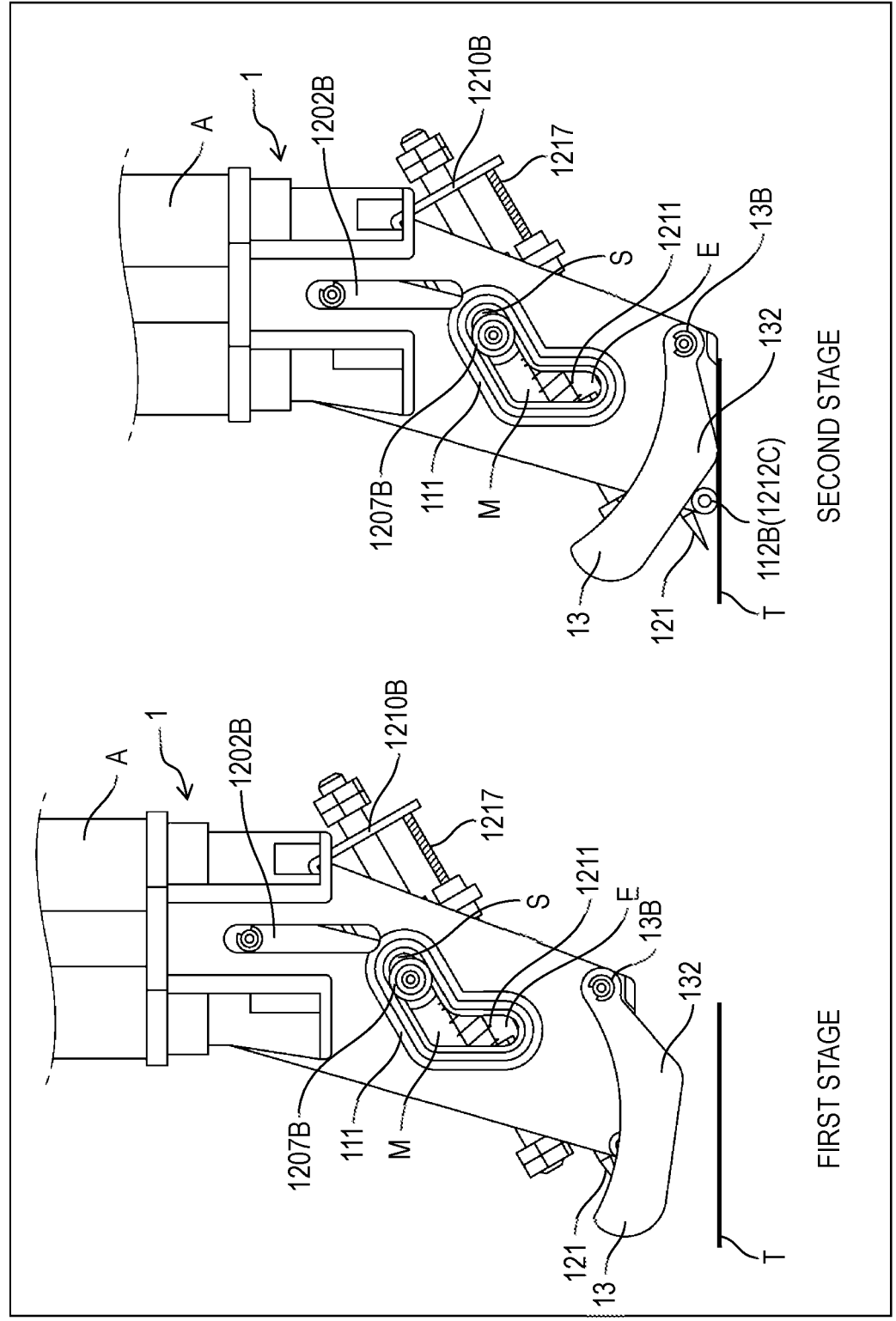
FIG. 4 is a view illustrating a step of peeling off release paper using end effector 1 (a first stage and a second stage).
Figure 5:
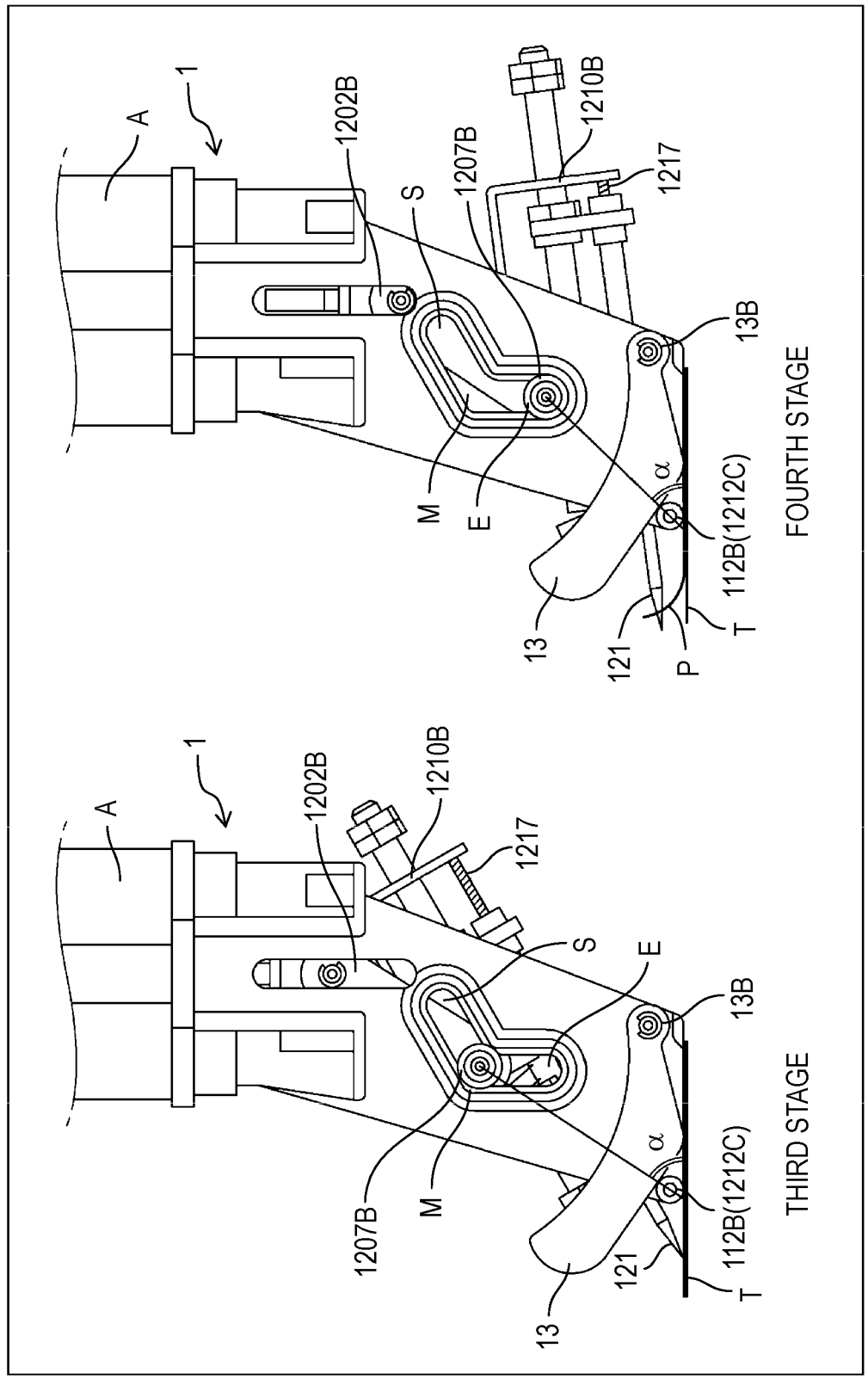
FIG. 5 is a view illustrating a step of peeling off release paper using end effector 1 (a third stage and a fourth stage).
Figure 6:
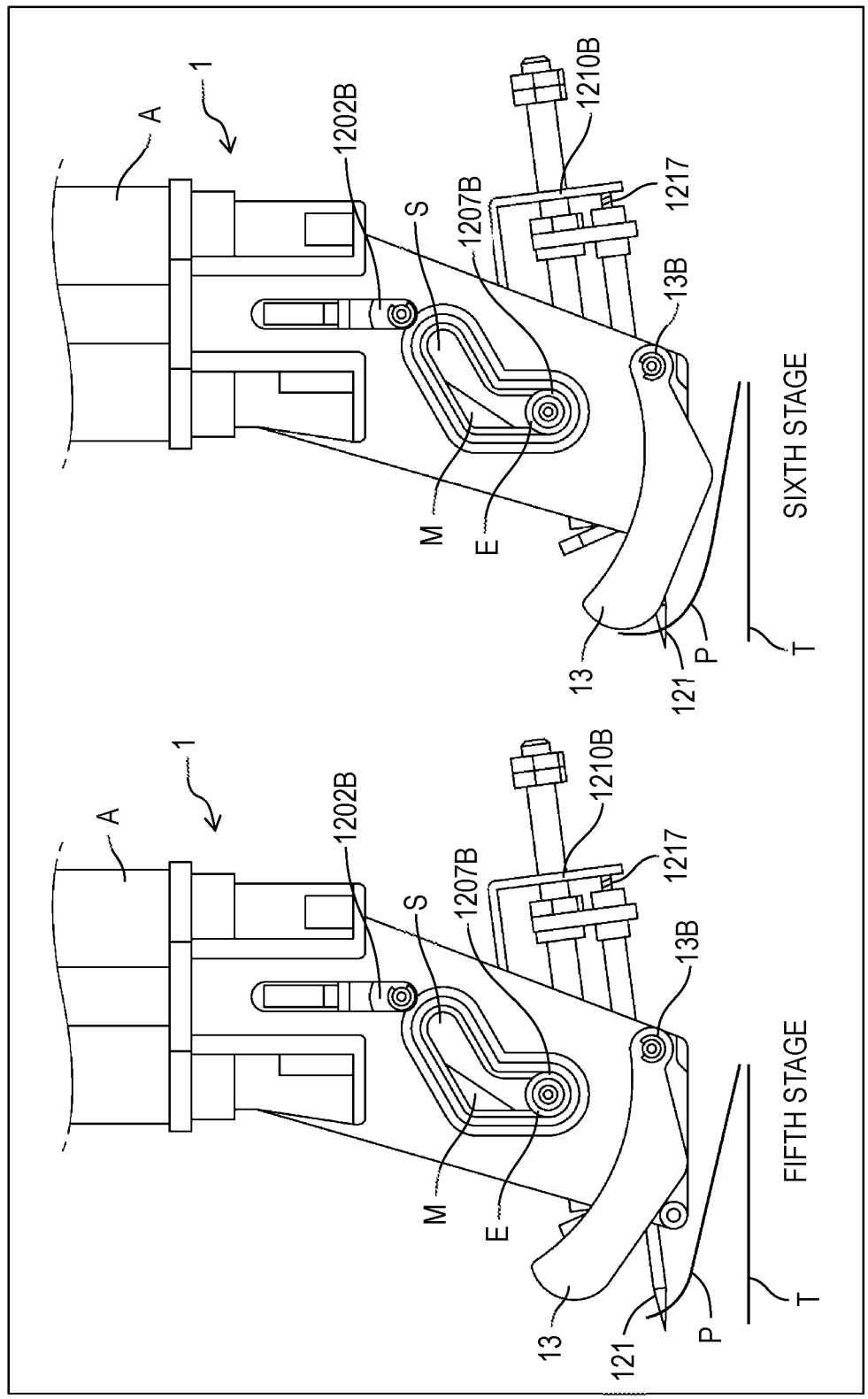
FIG. 6 is a view illustrating a step of peeling off release paper using end effector 1 (a fifth stage and a sixth stage).

FIGS. 4 to 6 are views illustrating a process of peeling off the release paper using end effector 1. FIG. 4 illustrates a first stage and a second stage, FIG. 5 illustrates a third stage and a fourth stage, and FIG. 6 illustrates a fifth stage and a sixth stage. The step of peeling off the release paper will be described with reference to FIGS. 2 and 3 described above as necessary in addition to FIGS. 4 to 6. Note that reference numerals may not be provided for constituent elements, of the constituent elements of end effector 1, which are not directly related to the step of peeling off the release paper.

The first stage illustrated on the left side of FIG. 4 illustrates the time of starting peeling off the release paper from adhesive sheet T using end effector 1. In this example, it is assumed that adhesive sheet T is placed on a working floor surface (including the upper surface of a mounting table in a factory line).

At the time of starting peeling off, end effector 1 is in a state of floating from the floor surface. In addition, cover 13 is at a position to hide needle 121 to secure safety. Although ball bearings 1207A and 1207B constitute the first support of rotary unit 12 as described above, the first support is located at start position S of guide groove 111. Note that the start position, end position, and intermediate position of illustrated guide groove 111 having a dogleg shape are denoted by S, E, and M, respectively. In this drawing, intermediate position M is a position where the angle of the groove changes.

Next, in the second stage illustrated on the right side of FIG. 4, the robot arm (not illustrated) moves, so that end effector 1 connected to the robot arm descends and comes into contact with the floor surface. Cover 13 pivots about rotation shaft 13C inserted into fulcrum portions 13A and 13B (see FIG. 2). Convex part 132 is provided on a lower portion of cover 13. When end effector 1 descends, convex part 132 first comes into contact with the floor surface. Accordingly, when end effector 1 further descends, cover 13 pivots in the clockwise direction in FIG. 4 so that the end of cover 13 which is located on the opposite side to fulcrum portions 13A and 13B rises. This pivoting exposes needle 121 hidden inside cover 13. That is, cover 13 is removed from the tip of needle 121.

Next, in the third stage illustrated on the left side of FIG. 5, actuator A pushes first link plate 1201 downward (see also FIG. 3). Then, first rotation shaft 1203 and one end of each of second link plates 1202A and 1202B are pushed down. In this case, ball bearings 1207A and 1207B as the first support are fitted so as to be movable along guide groove 111. Accordingly, the other end of each of second link plates 1202A and 1202B moves from start position S of guide groove 111 to intermediate position M along guide groove 111 together with ball bearings 1207A and 1207B constituting the first support. As can be seen from a comparison between the second stage and the third stage, second link plates 1202A and 1202B are swing links that swing in response to pressing by actuator A.

Reference is also made to FIGS. 2 and 3. When ball bearings 1207A and 1207B as the first support move from start position S to intermediate position M, coil spring 1211 pushed by cylinder 1204B pushes one end (1210A side) of pin pressure plate 1210. In conjunction with this, the other end (1210B side) of pin pressure plate 1210 then pushes stepped pin 1214, and the tip of stepped pin 1214 protrudes. That is, needle 121 protrudes and lightly pierces the release paper on the surface of adhesive sheet T placed on the floor surface. With the above mechanism, coil spring 1211 has a function of adjusting the pressure applied to the release paper by needle 121. Conversely, when it is not necessary to adjust the pressure applied to the release paper by needle 121, coil spring 1211 is unnecessary. In this case, the configuration may be changed to a configuration in which needle 121 simply protrudes according to the movement of ball bearings 1207A and 1207B as the first support, for example, by placing a pipe having no elastic force instead of coil spring 1211. Note that subtended angle α on the left side of FIG. 5 will be described together with the fourth stage illustrated on the right side of FIG. 5.

Next, in the fourth stage illustrated on the right side of FIG. 5, actuator A further pushes first link plate 1201 downward (see also FIG. 3). Then, first rotation shaft 1203 and one end of each of second link plates 1202A and 1202B are further pushed down. In this case, ball bearings 1207A and 1207B are fitted so as to be movable along guide groove 111. Accordingly, the other end of each of second link plates 1202A and 1202B moves from intermediate position M of guide groove 111 to end position E along guide groove 111 together with ball bearings 1207A and 1207B constituting the first support.

It has already been described that ball bearings 1207A and 1207B constitute the first support of rotary unit 12 and that cylinder 1212C is the second support of rotary unit 12. Cylinder 1212C (and hole 112B) is in contact with the floor surface on which adhesive sheet T is placed in both the third stage and the fourth stage. That is, the position of the second support of rotary unit 12 does not substantially change even with transition from the third stage to the fourth stage. On the other hand, ball bearings 1207A and 1207B constituting the first support are pushed down along guide groove 111 from intermediate position M to end position E. As a result, the line segment connecting the first support and the second support falls down toward the floor surface. That is, subtended angle α between the line segment connecting the first support and the second support and the floor surface decreases with transition from the third stage to the fourth stage. As a result, rotary unit 12 itself falls down toward the floor surface with transition from the third stage to the fourth stage. Then, the angle of needle 121 with respect to the floor surface also gradually decreases.

As the angle of needle 121 with respect to the floor surface gradually decreases, needle 121 that has lightly pierced the release paper in the third stage lifts up a part of the release paper to peel off it from adhesive sheet T (the state on the right side of FIG. 5). Release paper P being peeled off from adhesive sheet T is illustrated on the right side of FIG. 5.

Note that, in the state on the right side of FIG. 5, since the tip of needle 121 is not already grounded, a force for keeping coil spring 1211 (see FIGS. 2 and 3) contracted does not work. In other words, the force for compressing coil spring 1211 is released. Accordingly, coil spring 1211 is in an extended state. Then, the tip of needle 121 further protrudes in conjunction with coil spring 1211.

Next, in the fifth stage illustrated on the left side of FIG. 6, the robot arm to which end effector 1 is connected is operated to raise end effector 1 while release paper P is hooked on needle 121. Entire release paper P is then peeled off from adhesive sheet T.

In the sixth stage illustrated on the right side of FIG. 6, cover 13 pivots counterclockwise in the drawing, the bottom surface of cover 13 comes into contact with the release paper, and release paper P pierced by needle 121 starts to be removed from needle 121.

The process then returns to the first stage illustrated on the left side of FIG. 4. In the first stage, release paper P has already been removed. Since actuator A returns to the initial state, rotary unit 12 also returns to the initial state as illustrated on the left side of FIG. 4.

As described above, using end effector 1 according to an exemplary embodiment of the present disclosure makes it possible to easily peel off the release paper from the adhesive sheet. Since the release paper is pierced by needle 121 and peeled off by being scooped up, high accuracy is not required in the operation of the robot arm and end effector 1.

Figure 7:
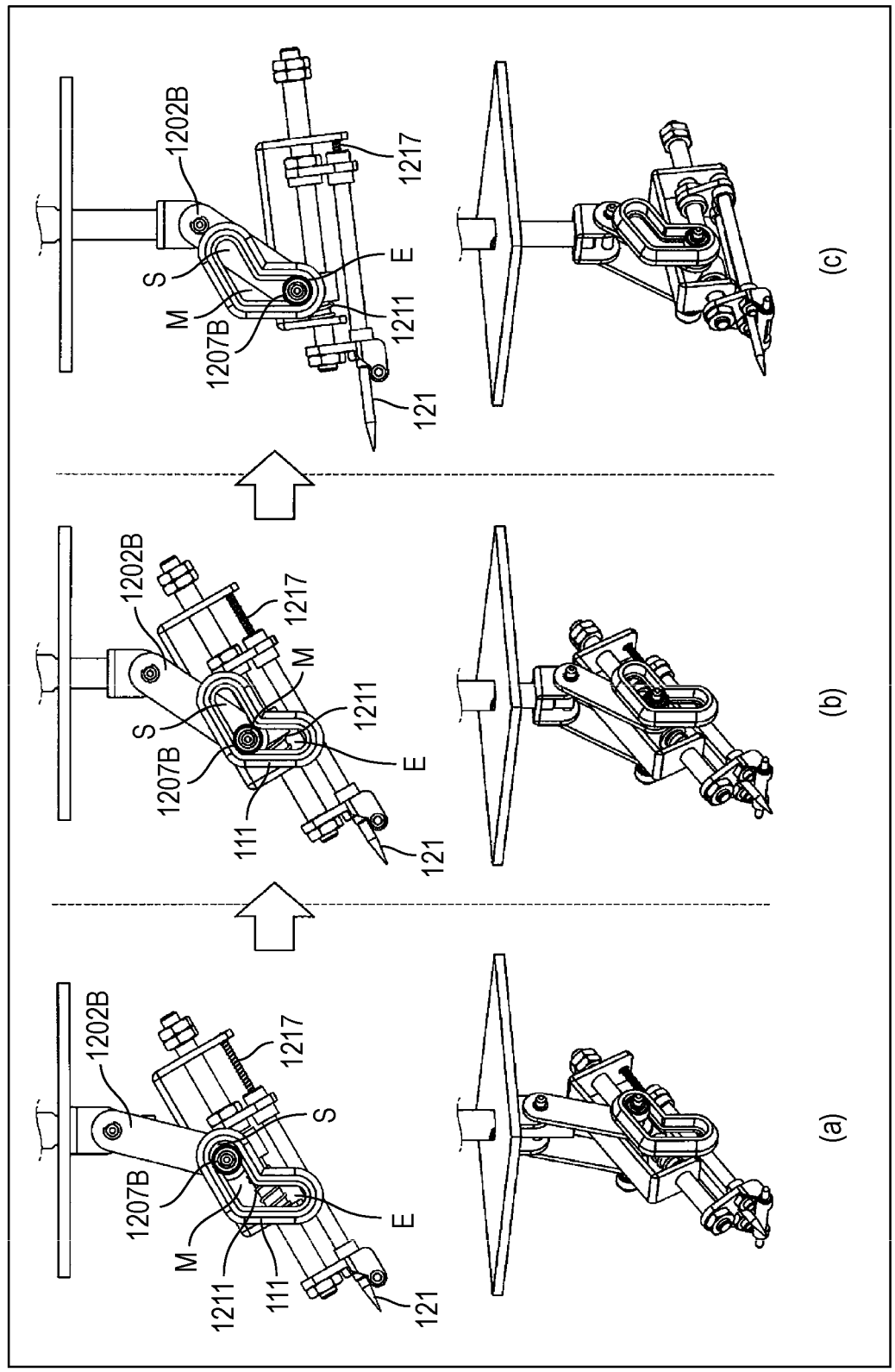
FIG. 7 is a view illustrating three postures of rotary unit 12, in which part (a) indicates a case where a first support is at start position S, part (b) indicates a case where the first support is at halfway position M, and part (c) indicates a case where the first support is at end position E.

FIG. 7 is a view illustrating three postures of rotary unit 12, in which part (a) of FIG. 7 indicates a case where the first support is at start position S, part (b) of FIG. 7 indicates a case where the first support is at halfway position M, and part (c) of FIG. 7 indicates a case where the first support is at end position E. Note that part (a) of FIG. 7 corresponds to the second stage illustrated in FIG. 4, part (b) of FIG. 7 corresponds to the third stage illustrated in FIG. 5, and part (c) of FIG. 7 corresponds to the fourth stage illustrated in FIG. 5. Further, the illustration of cover 13 is omitted.

As described above, FIG. 7 illustrates that the first support moves along guide groove 111 having a dogleg shape to cause needle 121 to protrude at intermediate position M and be inclined so as to lie sideways at end position E.

(Modification 1: Angle of Line Segment ME)

Figure 8:
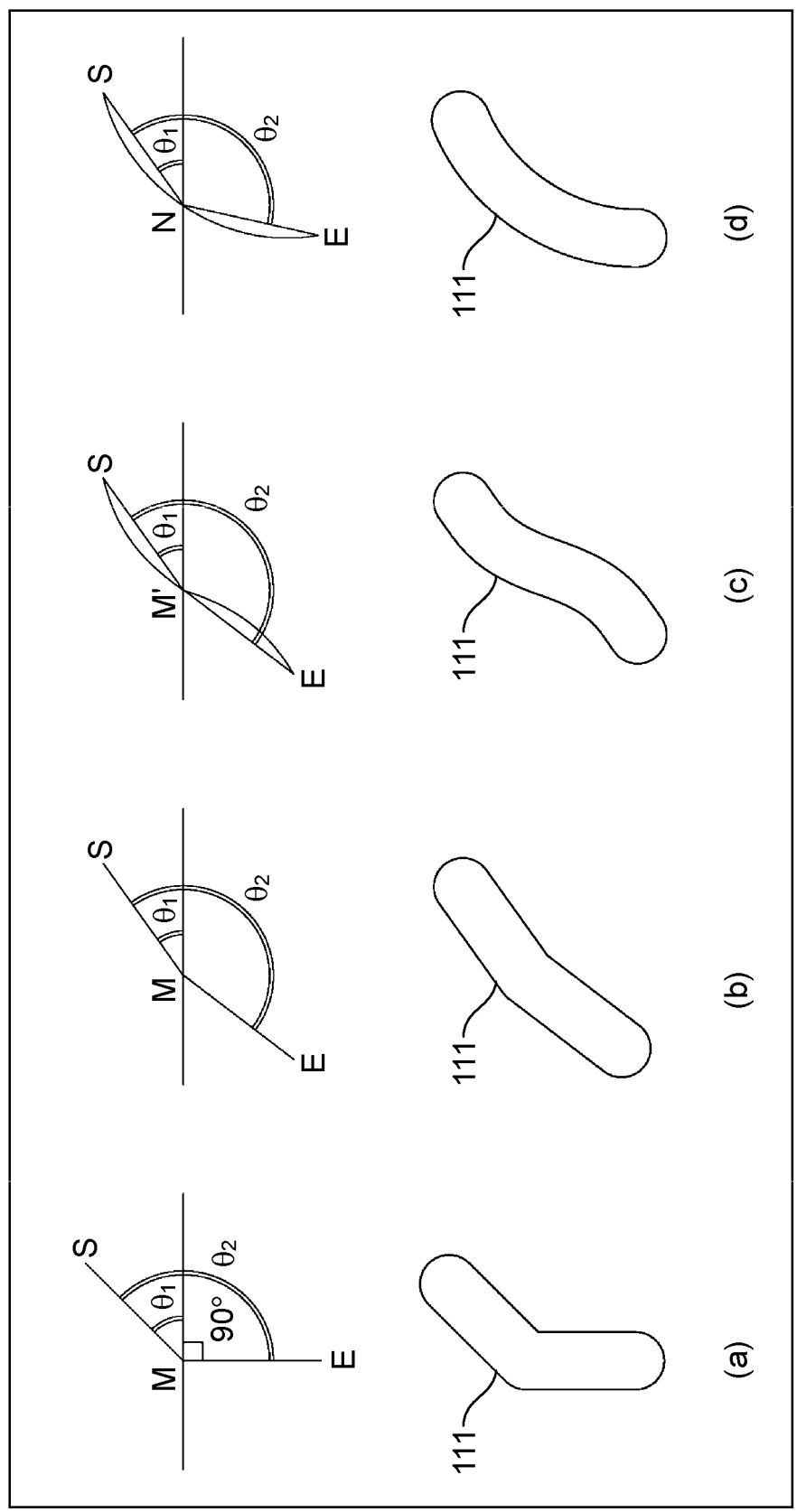
FIG. 8 is a view illustrating a modification of a shape of guide groove 111 of end effector 1 according to an exemplary embodiment of the present disclosure.

FIG. 8 is a view illustrating a modification of the shape of guide groove 111 of end effector 1 according to the exemplary embodiment of the present disclosure. As illustrated in part (a) of FIG. 8, guide groove 111 has start position S, intermediate position M, and end position E. A line segment connecting start position S and intermediate position M is defined as line segment SM. A line segment connecting intermediate position M and end position E is defined as line segment ME. The angle formed between line segment SM and the horizontal direction when end effector 1 is placed on the floor surface is $\theta_1$. The angle formed between line segment SM and line segment ME is $\theta_2$. At this time, in end effector 1 illustrated in FIGS. 1 to 7, start position S, intermediate position M, and end position E are determined so that line segment ME descends perpendicularly to the floor surface, that is, $\theta_2=\theta_1+90°$, and guide groove 111 is formed along line segment SM and line segment ME. This produces the following preferable effects. When the first support moves along line segment SM, needle 121 in rotation unit 12 protrudes, whereas when the first support moves along line segment ME, needle 121 tilts toward the floor surface to scoop up the release paper.

However, the angle of line segment ME is not limited to the above angle. For example, as illustrated in part (b) of FIG. 8, angles $\theta_1$ and $\theta_2$ are determined so as to satisfy $\theta_1<\theta_2<\theta_1+180°$, start position S, intermediate position M, and end position E are determined on the basis of these angles, and guide groove 111 can be formed along line segment SM and line segment ME.

(Modification 2: Curved Guide Groove)

In addition, in end effector 1 described above, the shape of guide groove 111 is formed along the locus obtained by joining the two straight lines of line segment SM and line segment ME. However, the shape of guide groove 111 can also be determined along the locus of the curve.

For example, consider a case where there is inflection point M' on the curve as illustrated in part (c) of FIG. 8. The inflection point refers to a point on a continuous curve at which the curve changes from concave to convex or vice versa. Assuming that inflection point M' is an intermediate position, straight line segment SM' and line segment M'E are drawn on the basis of three points (start position S, inflection point M', and end position E) included in the original curve, and angle $\theta_1$ and angle $\theta_2$ are determined in the same manner as described above on the basis of these two line segments. When angles $\theta_1$ and $\theta_2$ satisfy the inequality $\theta_1<\theta_2<\theta_1+180°$, the shape of guide groove 111 may be determined along the original curve.

In addition, as illustrated in part (d) of FIG. 8, when there is no inflection point on the curve, an arbitrary point on the curve may be determined as intermediate position N. Then, angles $\theta_1$ and $\theta_2$ are determined on the basis of line segment SN and line segment NE which are straight lines. When angles $\theta_1$ and $\theta_2$ satisfy the inequality $\theta_1<\theta_2<\theta_1+180°$, the shape of guide groove 111 may be determined along the original curve.

As described above, swing link 1202 that swings in response to pressing by actuator A may be further provided, and swing link 1202 may be connected to the first support (ball bearings 1207A and 1207B). As a result, the swing link receives the pressing force by actuator A and transmits the force to the first support. Accordingly, the first support appropriately moves along guide groove 111.

In addition, rotary unit 12 may include coil spring 1211 (elastic body) for adjusting pressurization to release paper by needle 121. Accordingly, the pressing force can be adjusted so that needle 121 does not pierce the release paper together with adhesive sheet T.

In addition, guide groove 111 may have a dogleg shape. This makes it possible to cause needle 121 to protrude and pierce the release paper and to scoop up the release paper, thereby peeling off the release paper from adhesive sheet T.

Assume that guide groove 111 has start position S, intermediate position M, and end position E, a line segment connecting start position S and intermediate position M is defined as line segment SM, a line segment connecting intermediate position M and end position E is defined as line segment ME, the angle formed between line segment SM and the horizontal direction when end effector 1 is placed on the floor surface is defined as $\theta_1$, and the angle formed between line segment SM and line segment ME is defined as $\theta_2$, $\theta_1<\theta_2<\theta_1+180°$ is satisfied. More specifically, $\theta_1+45°<\theta_2<\theta_1+135°$ is satisfied, and more specifically, $\theta_2=\theta_1+90°$ is satisfied. As a result, the movement of rotary unit 12 and needle 121 of rotary unit 12 can be appropriately defined while first support moves from intermediate position M to end position E.

Rotary unit 12 may further include second support (cylinder 1212C), and the second support may be provided on a side closer to the tip of needle 121 than the first support portion. As a result, the first support moves along guide groove 111 with the second support provided on the side close to the tip of needle 121 as a fulcrum, so that rotary unit 12 rotates to peel off the release paper by scooping up it with needle 121.

Further, cover 13 for protecting needle 121 is further provided, and cover 13 pivots with respect to housing 11 to remove the peeled release paper. As a result, cover 13 can have a function of removing peeled release paper in addition to the safety function.

While various exemplary embodiments have been described in the foregoing with reference to the drawings, it is obvious that the present disclosure is not limited thereto. For those skilled in the art, it is obvious that various modification examples, rectification examples, substitution examples, addition examples, deletion examples, and equivalent examples could be conceived within the scope of claims, and thus it is obviously understood that those examples belong to the technical scope of the present disclosure. Additionally, each component in the various exemplary embodiments described above may be appropriately combined without departing from the spirit of the disclosure.

The present disclosure is useful as an end effector that can peel off release paper.

What is claimed is:

1. An end effector configured to be connected to a robot arm for peeling off release paper, the end effector comprising:
   a housing including a guide groove having a start position S, an intermediate position M, and an end position E; and
   a rotary unit including a needle and a first support configured to move along the guide groove,
   wherein assuming that a line segment connecting the start position S and the intermediate position M is defined as a line segment SM, a line segment connecting the intermediate position M and the end position E is defined as a line segment ME, an angle formed between the line segment SM and a horizontal direction when the end effector is placed on a floor surface is defined as $\theta_1$, and an angle formed between the line segment SM and the line segment ME is defined as $\theta_2$, $\theta_1<\theta_2<\theta_1+180°$ is satisfied.

2. The end effector according to claim 1, wherein $\theta_2=\theta_1+90°$ is satisfied.

3. The end effector according to claim 1, further comprising a swing link configured to swing in response to pressing by an actuator,
   wherein the swing link is connected to the first support.

4. The end effector according to claim 1, wherein the rotary unit includes an elastic body for adjusting pressure applied to the release paper by the needle.

5. The end effector according to claim 1, wherein the guide groove has a dogleg shape.

6. The end effector according to claim 1, wherein
   the rotary unit further includes a second support, and
   the second support is provided on a side closer to a tip of the needle than the first support.

7. The end effector according to claim 1, further comprising a cover configured to protect the needle,
   wherein the cover pivots relative to the housing to remove the peeled release paper.

\* \* \* \* \*